US010067780B2

(12) United States Patent
Chang et al.

(10) Patent No.: US 10,067,780 B2
(45) Date of Patent: Sep. 4, 2018

(54) PERFORMANCE-BASED PUBLIC CLOUD SELECTION FOR A HYBRID CLOUD ENVIRONMENT

(71) Applicant: Cisco Technology, Inc., San Jose, CA (US)

(72) Inventors: David W. Chang, Milpitas, CA (US); Rakesh M. Pathak, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 22 days.

(21) Appl. No.: 14/876,092

(22) Filed: Oct. 6, 2015

(65) Prior Publication Data
US 2017/0097841 A1    Apr. 6, 2017

(51) Int. Cl.
| | |
|---|---|
| G06F 9/455 | (2018.01) |
| H04L 29/08 | (2006.01) |
| H04L 29/06 | (2006.01) |
| H04L 12/24 | (2006.01) |
| H04L 12/26 | (2006.01) |

(52) U.S. Cl.
CPC ........ *G06F 9/45558* (2013.01); *H04L 41/145* (2013.01); *H04L 41/5009* (2013.01); *H04L 41/5038* (2013.01); *H04L 63/0272* (2013.01); *H04L 67/10* (2013.01); *G06F 2009/4557* (2013.01); *G06F 2009/45562* (2013.01); *G06F 2009/45595* (2013.01); *H04L 41/5096* (2013.01); *H04L 43/08* (2013.01)

(58) Field of Classification Search
CPC ...................................................... H04L 43/08
See application file for complete search history.

(56) References Cited

U.S. PATENT DOCUMENTS

| | | | |
|---|---|---|---|
| 6,108,782 A | 8/2000 | Fletcher et al. | |
| 6,343,290 B1 | 1/2002 | Cossins et al. | |

(Continued)

FOREIGN PATENT DOCUMENTS

| | | |
|---|---|---|
| CN | 101394360 | 7/2011 |
| CN | 102164091 | 8/2011 |

(Continued)

OTHER PUBLICATIONS

Real-Time Performance Monitoring on Juniper Networks Devices, 2010, Juniper Networks, Inc.*

(Continued)

*Primary Examiner* — Charlie Sun
(74) *Attorney, Agent, or Firm* — Polsinelli PC

(57) ABSTRACT

A hybrid cloud solution for securely extending a private cloud or network to a public cloud can be enhanced with tools for evaluating the resources offered by multiple public cloud providers. In an example embodiment, a public cloud evaluation system can be used to create a virtual machine (VM) in a public cloud to serve the function of a public cloud evaluation agent. The public cloud evaluation agent can instantiate one or more VMs and other resources in the public cloud, and configure the VMs and resources to execute performance evaluation software. The results of the performance evaluation software can be transmitted to a private enterprise network, and analyzed to determine whether the public cloud is an optimal public cloud for hosting an enterprise application.

20 Claims, 7 Drawing Sheets

(56) References Cited

U.S. PATENT DOCUMENTS

| | | | |
|---|---|---|---|
| 6,721,804 B1 | 4/2004 | Rubin et al. |
| 6,733,449 B1 | 5/2004 | Krishnamurthy et al. |
| 7,277,948 B2 | 10/2007 | Igarashi et al. |
| 7,480,672 B2 | 1/2009 | Hahn et al. |
| 7,496,043 B1 | 2/2009 | Leong et al. |
| 7,917,647 B2 | 3/2011 | Cooper et al. |
| 8,028,071 B1 | 9/2011 | Mahalingam et al. |
| 8,041,714 B2 | 10/2011 | Aymeloglu et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,301,746 B2 | 10/2012 | Head et al. |
| 8,345,692 B2 | 1/2013 | Smith |
| 8,406,141 B1 | 3/2013 | Couturier et al. |
| 8,477,610 B2 | 7/2013 | Zuo et al. |
| 8,495,356 B2 | 7/2013 | Ashok et al. |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,663 B2 | 10/2013 | Baucke et al. |
| 8,590,050 B2 | 11/2013 | Nagpal et al. |
| 8,630,291 B2 | 1/2014 | Shaffer et al. |
| 8,639,787 B2 | 1/2014 | Lagergren et al. |
| 8,660,129 B1 | 2/2014 | Brendel et al. |
| 8,719,804 B2 | 5/2014 | Jain |
| 8,775,576 B2 | 7/2014 | Hebert et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 9,015,324 B2 | 4/2015 | Jackson |
| 9,043,439 B2 | 5/2015 | Bicket et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,164,795 B1 | 10/2015 | Vincent |
| 9,167,050 B2 | 10/2015 | Durazzo et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0073337 A1 | 6/2002 | Ioele et al. |
| 2002/0143928 A1 | 10/2002 | Maltz et al. |
| 2002/0174216 A1* | 11/2002 | Shorey ............... H04L 12/2602 709/224 |
| 2003/0018591 A1 | 1/2003 | Komisky |
| 2003/0228585 A1* | 12/2003 | Inoko ................. C12Q 1/6881 435/6.11 |
| 2006/0126665 A1 | 6/2006 | Ward et al. |
| 2008/0201711 A1 | 8/2008 | Amir Husain |
| 2008/0235755 A1 | 9/2008 | Blaisdell et al. |
| 2009/0019367 A1 | 1/2009 | Cavagnari et al. |
| 2009/0138763 A1 | 5/2009 | Arnold |
| 2009/0177775 A1 | 7/2009 | Radia et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0191783 A1 | 7/2010 | Mason et al. |
| 2010/0205601 A1 | 8/2010 | Abbas et al. |
| 2010/0211782 A1 | 8/2010 | Auradkar et al. |
| 2010/0318609 A1 | 12/2010 | Lahiri et al. |
| 2010/0325199 A1 | 12/2010 | Park et al. |
| 2010/0333116 A1 | 12/2010 | Prahlad et al. |
| 2011/0035754 A1 | 2/2011 | Srinivasan |
| 2011/0072489 A1 | 3/2011 | Parann-Nissany |
| 2011/0075667 A1 | 3/2011 | Li et al. |
| 2011/0126099 A1 | 5/2011 | Anderson et al. |
| 2011/0173303 A1 | 7/2011 | Rider |
| 2011/0219434 A1 | 9/2011 | Betz et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261828 A1 | 10/2011 | Smith |
| 2011/0276675 A1 | 11/2011 | Singh et al. |
| 2011/0276951 A1 | 11/2011 | Jain |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0214506 A1 | 8/2012 | Skaaksrud et al. |
| 2012/0222106 A1 | 8/2012 | Kuehl |
| 2012/0240113 A1 | 9/2012 | Hur |
| 2012/0265976 A1 | 10/2012 | Spiers et al. |
| 2012/0281706 A1 | 11/2012 | Agarwal et al. |
| 2012/0290647 A1 | 11/2012 | Ellison et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0091557 A1 | 4/2013 | Gurrapu |
| 2013/0097601 A1 | 4/2013 | Podvratnik et al. |
| 2013/0111540 A1 | 5/2013 | Sabin |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159496 A1* | 6/2013 | Hamilton ............ H04L 41/5067 709/224 |
| 2013/0160008 A1 | 6/2013 | Cawlfield et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0297769 A1 | 11/2013 | Chang et al. |

(56) References Cited

U.S. PATENT DOCUMENTS

| | | | |
|---|---|---|---|
| 2013/0318240 A1 | 11/2013 | Hebert et al. | |
| 2013/0318546 A1 | 11/2013 | Kothuri et al. | |
| 2013/0339949 A1* | 12/2013 | Spiers | G06F 9/5077 |
| | | | 718/1 |
| 2014/0006481 A1 | 1/2014 | Frey et al. | |
| 2014/0006585 A1 | 1/2014 | Dunbar et al. | |
| 2014/0040473 A1 | 2/2014 | Ho et al. | |
| 2014/0040883 A1 | 2/2014 | Tompkins | |
| 2014/0075357 A1 | 3/2014 | Flores et al. | |
| 2014/0075501 A1 | 3/2014 | Srinivasan et al. | |
| 2014/0108985 A1 | 4/2014 | Scott et al. | |
| 2014/0156557 A1 | 6/2014 | Zeng et al. | |
| 2014/0164486 A1 | 6/2014 | Ravichandran et al. | |
| 2014/0189095 A1 | 7/2014 | Lindberg et al. | |
| 2014/0189125 A1 | 7/2014 | Amies et al. | |
| 2014/0222953 A1 | 8/2014 | Karve et al. | |
| 2014/0282536 A1 | 9/2014 | Dave et al. | |
| 2014/0282889 A1 | 9/2014 | Ishaya et al. | |
| 2014/0297569 A1 | 10/2014 | Clark et al. | |
| 2014/0317261 A1 | 10/2014 | Shatzkamer et al. | |
| 2014/0366155 A1 | 12/2014 | Chang et al. | |
| 2015/0043576 A1 | 2/2015 | Dixon et al. | |
| 2015/0052247 A1 | 2/2015 | Threefoot et al. | |
| 2015/0052517 A1 | 2/2015 | Raghu et al. | |
| 2015/0058382 A1 | 2/2015 | St Laurent et al. | |
| 2015/0058459 A1 | 2/2015 | Amendjian et al. | |
| 2015/0071285 A1 | 3/2015 | Kumar et al. | |
| 2015/0106802 A1 | 4/2015 | Ivanov et al. | |
| 2015/0106805 A1 | 4/2015 | Melander et al. | |
| 2015/0120914 A1 | 4/2015 | Wada et al. | |
| 2015/0227405 A1 | 8/2015 | Jan et al. | |
| 2015/0242204 A1 | 8/2015 | Hassine et al. | |
| 2015/0281067 A1 | 10/2015 | Wu | |
| 2015/0281113 A1 | 10/2015 | Siciliano et al. | |
| 2015/0319063 A1* | 11/2015 | Zourzouvillys | H04L 65/1006 |
| | | | 370/352 |
| 2015/0326524 A1 | 11/2015 | Tankala et al. | |
| 2015/0373108 A1 | 12/2015 | Fleming et al. | |
| 2016/0062786 A1 | 3/2016 | Meng et al. | |
| 2016/0099847 A1 | 4/2016 | Melander et al. | |
| 2016/0105393 A1 | 4/2016 | Thakkar et al. | |
| 2016/0127184 A1 | 5/2016 | Bursell | |
| 2016/0134557 A1 | 5/2016 | Steinder et al. | |
| 2016/0188527 A1 | 6/2016 | Cherian et al. | |
| 2016/0253078 A1 | 9/2016 | Ebtekar et al. | |
| 2016/0254968 A1 | 9/2016 | Ebtekar et al. | |
| 2016/0261564 A1 | 9/2016 | Foxhoven et al. | |
| 2016/0277368 A1 | 9/2016 | Narayanaswamy et al. | |
| 2017/0005948 A1 | 1/2017 | Melander et al. | |
| 2017/0024260 A1 | 1/2017 | Chandrasekaran et al. | |
| 2017/0026470 A1 | 1/2017 | Bhargava et al. | |
| 2017/0041342 A1 | 2/2017 | Efremov et al. | |
| 2017/0054659 A1 | 2/2017 | Ergin et al. | |
| 2017/0099188 A1 | 4/2017 | Chang et al. | |
| 2017/0104755 A1 | 4/2017 | Arregoces et al. | |
| 2017/0147297 A1 | 5/2017 | Krishnamurthy et al. | |
| 2017/0264663 A1 | 9/2017 | Bicket et al. | |
| 2017/0339070 A1 | 11/2017 | Chang et al. | |

FOREIGN PATENT DOCUMENTS

| | | |
|---|---|---|
| CN | 102918499 | 2/2013 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| WO | WO 2009/155574 | 12/2009 |
| WO | WO 2010/030915 | 3/2010 |
| WO | WO 2013/158707 | 10/2013 |

OTHER PUBLICATIONS

Bosch, Virtualization, 2012, Lehigh University.*

Cisco Systems, Inc., "Cisco Intercloud Fabric: Hybrid Cloud with Choice, Consistency, Control and Compliance," Dec. 10, 2014.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Technology, Inc., "Cisco Expands Videoscape TV Platform Into the Cloud," Jan. 6, 2014, Las Vegas, Nevada, Press Release, 3 pages.

CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.

Fang K., "LISP MAC-EID-TO-RLOC Mapping (LISP based L2VPN)," Network Working Group, Internet Draft, Cisco Systems, Jan. 2012, 12 pages.

Herry, William, "Keep It Simple, Stupid: OpenStack nova-scheduler and its algorithm", May 12, 2012, IBM, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Naik, Vijay K., et al., "Harmony: A Desktop Grid for Delivering Enterprise Computations," Grid Computing, 2003, Fourth International Workshop on Proceedings, Nov. 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technology/ accessed Jul. 22, 2015, 6 pages.

Nielsen, "Television " http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

(56) References Cited

OTHER PUBLICATIONS

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.

* cited by examiner

PERFORMANCE-BASED PUBLIC CLOUD SELECTION FOR A HYBRID CLOUD ENVIRONMENT

TECHNICAL FIELD

The subject matter of this disclosure relates in general to the field of computer networks, and more specifically to evaluate the performances of one or more public clouds that may be integrated with a private cloud.

BACKGROUND

Industry trends indicate a growing movement among enterprises and other entities towards hybrid cloud architectures. These enterprises and other entities may be choosing such systems so that they can acquire additional on-demand computing, storage, and network resources, and eliminating the need to build for peak capacity within their own data centers. A potential advantage of leveraging public clouds is that they may not have the same initial capital investments that may be necessary to build out a company's own private data center. Another potential benefit for public cloud is that they may better absorb a company's need for elasticity by providing almost unlimited pay-as-you-grow expansion. Although hybrid cloud designs can be conceptually and financially attractive, enterprises often have little insight into which third party public cloud provider offerings may be most suitable for these enterprises' specific workloads.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
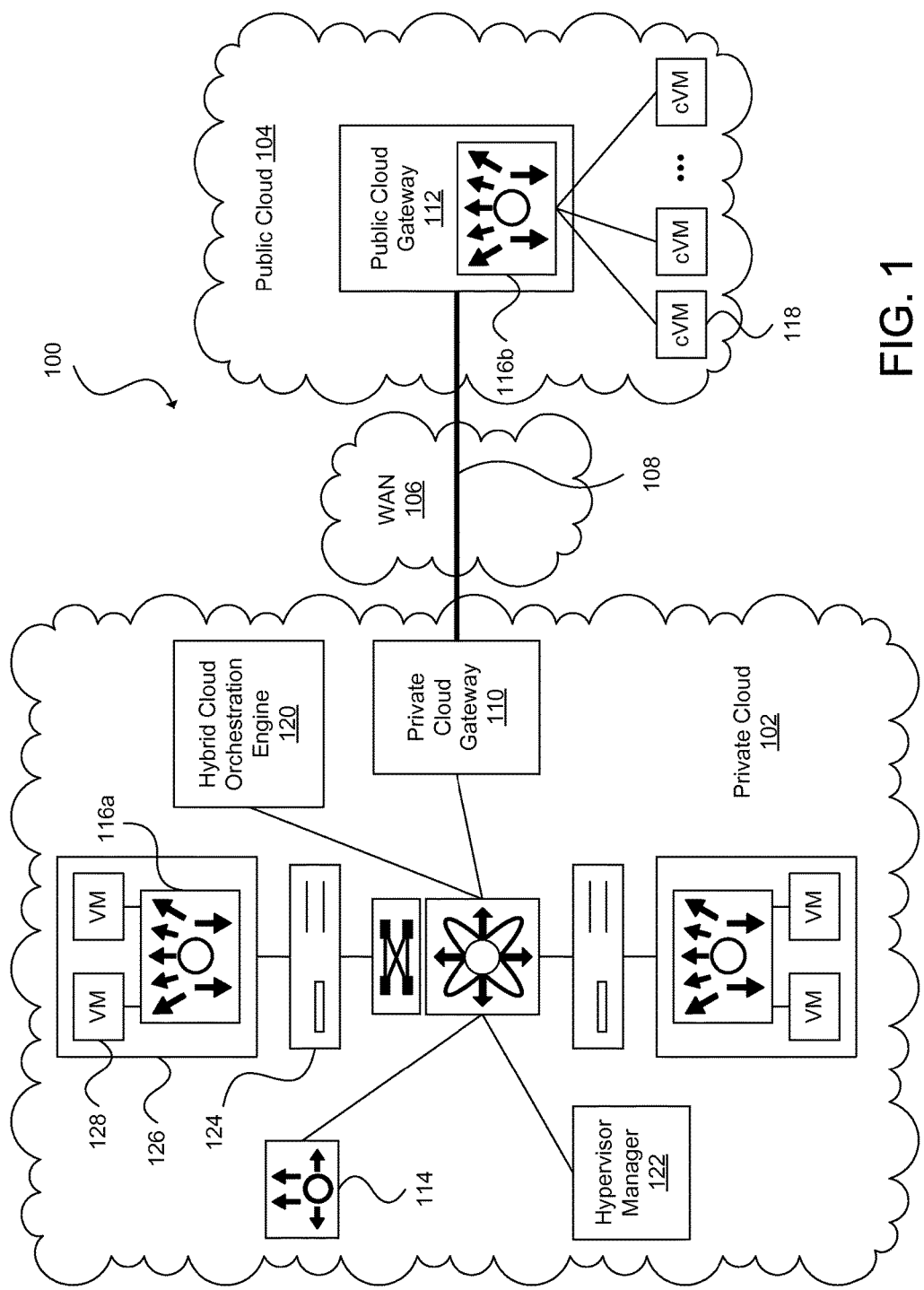
FIG. 1 illustrates an example hybrid cloud environment that can be utilized in an example embodiment.

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A hybrid cloud solution for securely extending a private cloud to a public cloud can be enhanced with tools for evaluating the resources offered by multiple public cloud providers. The resources can include compute, storage, or network resources and services. In an example embodiment, a hybrid cloud orchestration engine can be used to instantiate a virtual machine (VM) in a public cloud to serve the function of a public cloud evaluation agent. An image of the public cloud evaluation agent can include configuration information for deploying a test application in the public cloud and performance evaluation software that is run by the test application. The public cloud evaluation agent can instantiate one or more VMs in the public cloud and configure the VMs using the configuration information. The public cloud evaluation agent can distribute the performance evaluation software among the VMs, and the VMs can execute the performance evaluation software. The results of the performance evaluation software can be sent to the hybrid cloud orchestration engine, and analyzed to determine whether the public cloud is an optimal public cloud for hosting an enterprise application.

In an example embodiment, the hybrid cloud orchestration engine can capture measures of network performance, such as network bandwidth, throughput, latency, jitter, or error rate between a private cloud and a public cloud, including a specific region or zone of the private cloud and a specific region or zone of the public cloud, as well as between multiple regions or zones of one or many public clouds. For instance, a private cloud agent located in a private enterprise network and a public cloud evaluation agent located in the public network can exchange network traffic over a secure extension, and the results of the exchange can be used to calculate the measures of network performance.

DETAILED DESCRIPTION

A computer network is a geographically distributed collection of nodes interconnected by communication links and segments for transporting data between endpoints, such as personal computers and workstations. Many types of networks are available, with the types ranging from Local Area Networks (LANs) and Wide Area Networks (WANs) to overlay networks and Software-Defined Networks (SDNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Overlay networks can also include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization may allow hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Cloud computing can also be provided in a network to provide computing services using shared resources. Cloud computing can generally include Internet-based computing in which computing resources are dynamically provisioned and allocated to client or user computers or other devices on-demand, from a collection of resources available via the network or the cloud. Cloud computing resources, for example, can include any type of resource, such as computing, storage, and networking, among others. For instance, resources may include service devices (firewalls, deep packet inspectors, traffic monitors, load balancers, etc.), compute/processing devices (servers, CPUs, GPUs, random access memory, caches, etc.), and storage devices (e.g., network attached storages, storage area network devices, hard disk drives, solid-state devices, etc.), among others. In addition, such resources may be used to support virtual networks, VMs, databases, applications, etc.

Cloud computing resources may include a "private cloud," a "public cloud," and/or a "hybrid cloud." A "private cloud" can be a cloud infrastructure operated by an enterprise for use by the enterprise, while a "public cloud" can be a cloud infrastructure that provides services and resources over a network for public use. A "hybrid cloud" can be a cloud infrastructure composed of two or more clouds that inter-operate or federate through cloud orchestration, cloud management, cloud automation, or similar technologies. A hybrid cloud can be thought of as an interaction between private and public clouds where a private cloud joins a public cloud and utilizes public cloud resources in a secure and scalable manner.

FIG. 1 illustrates an example hybrid cloud environment 100 that can be utilized in an example embodiment. The hybrid cloud environment 100 can include a plurality of networks or clouds, such as a private cloud 102 (e.g., an enterprise datacenter) and a public cloud 104 separated by a WAN 106, such as the Internet. Although a hybrid cloud is sometimes defined as consisting of a private cloud and a public cloud, it should be understood that many aspects of this disclosure can be practiced in various configurations (e.g., two or more public clouds hosted by third party cloud providers and/or two or more private clouds of an enterprise located in different locations). The private cloud 102 and the public cloud 104 can be integrated using overlay network techniques, such as VXLAN, NVGRE, NVO3, STT, or other overlay network protocols known to those of ordinary skill. The private cloud 102 and public cloud 104 can be connected via a secure site-to-site tunnel 108 between a private cloud gateway 110 and a public cloud gateway 112. The private cloud gateway 110 can be configured as a VM for extending the private cloud across the Internet to the public cloud 104 through the secure site-to-site tunnel 108. The public cloud gateway 112 can be configured as a VM switch overlay for interconnecting workloads running in the public cloud 104 via secure access tunnels, and for forwarding network traffic to the private network 102 using the site-to-site tunnel 108. In an example embodiment, the private cloud gateway 110 can be implemented using an Intercloud Fabric™ Extender (ICX) from Cisco®, Systems, Inc. of San Jose, Calif. (Cisco®), the public cloud gateway 112 can be implemented using an Intercloud Fabric™ Switch (ICS) from Cisco®, and the ICX/ICS pair can form an Intercloud Fabric™ Cloud (ICFCloud).

In some example embodiments, the private cloud gateway 110 can establish, from the private cloud 102, the secure site-to-site tunnel 108 to interconnect with the public cloud gateway 112, and interact with a virtual switch controller or Virtual Supervisor Module (VSM) 114. The VSM 114 can serve as a network controller for managing the network and security policies of the overlay network. In an example embodiment, VSM 114 can be implemented in an active-standby model to ensure high availability, with a first VSM functioning in a primary role and a second VSM functioning in a secondary role. If the first VSM fails, the second VSM can take over control. A virtual chassis model can be used to represent VSM 114 and each virtual switch or Virtual Ethernet Module (VEM) under the VSM's control or within the VSM's domain, such as VEM 116a in the private cloud and public cloud VEM 116b. The high availability pair of VSMs 114 can be associated with slot numbers 1 and 2 in the virtual chassis, and the VEMs 116a and 116b can be sequentially assigned to the remaining slots. In the virtual chassis model, VSM 144 may be configured to provide control plane functionality for the virtual switch 116a and 116b. The VEMs 116a and 116b can provide network connectivity and switching capability for VMs hosted on a corresponding server like a line card in a modular switching platform, and can operate as part of a data plane associated with the control plane of VSM 114. Unlike multiple line cards in a single chassis, each VEM can act as an independent switch from a forwarding perspective. In some example embodiments, the VEMs 116a and 116b may form a distributed virtual switch that can be controlled by the VSM 114. In an example embodiment, the VSM 114 and VEMs 116a and 116b can be implemented using Cisco Nexus® 1000V Series Switches.

Private cloud 102 can also include a hybrid cloud orchestration engine 120, which can be a management plane VM for auto-provisioning resources within the hybrid cloud environment 100. The hybrid cloud orchestration engine 120 can be a management platform running in the private cloud 102, and may be responsible for providing hybrid cloud operations, translating between private cloud and public cloud interfaces, managing cloud resources, instantiating cloud gateways and cloud VMs though a private virtualization platform or hypervisor manager 122 and public cloud provider application programming interfaces (APIs). The hybrid cloud orchestration engine 120 may also monitor the health of all of the components of the network (e.g., cloud gateways, VMs, and tunnels) and ensure high availability of those components.

In an example embodiment, the hybrid cloud orchestration engine 120 can be implemented as a virtual appliance, such as the Intercloud Fabric™ Director (ICFD) from Cisco®. The ICFD can provide a single point of management and consumption of hybrid cloud resources. That is, the ICFD can offer a single console so that users can provision workloads and associated policies. The ICFD can also expose northbound APIs, which allow users to programmatically manage their workloads in the hybrid cloud environment 100 or integrate with other cloud management platforms.

The private cloud 102 can include one or more physical servers 124 that each deploy a respective hypervisor 126 (also sometimes referred to as a virtual machine manager or a virtual machine monitor (VMM)), which can be configured for managing multiple "virtual partitions." As used herein, a "virtual partition" may be an instance of a VM (e.g., VM 128 or cVM 118), sandbox, container, or any other isolated environment that can have software operating within it. The software may include an operating system and application software. For software running within a virtual partition, the virtual partition may appear to be a distinct physical machine. Although the cVMs 118 are not shown to be encapsulated by a hypervisor in this example, it will be appreciated that VMs may or may not be managed by a hypervisor. In some example embodiments, the hypervisor 126 may be a native or "bare metal" hypervisor that runs directly on hardware, but that may alternatively run under host software executing on hardware. The hypervisor 126 can be managed by the virtualization platform or hypervisor manager 122, such as vSphere® from VMware®, Inc. of Palo Alto, Calif., Hyper-V® from Microsoft® Corp. of Seattle, Wash., XenServer® from Citrix® Systems, Inc. of Santa Clara, Calif., or Red Hat® Enterprise Virtualization from Red Hat®, Inc. of Raleigh, N.C.

Each VM, including VMs 128 and cVMs 118, can host a private application. In some example embodiments, each public cloud VM 118 may be connected to the public cloud gateway 112 via secure access tunnels, as discussed elsewhere herein. In some example embodiments, one or more cVMs 118 can be configured to operate as a public cloud firewall (not shown), such as an Intercloud Fabric™ Firewall or Virtual Security Gateway (VSG) from Cisco®. In some example embodiments, one or more cVMs 118 can be configured to operate as a public cloud router (not shown), such as an Intercloud Fabric™ Router or Cloud Services Router (CSR) from Cisco®.

In some example embodiments, the public cloud gateway 112 can establish, from the public cloud 104, the secure site-to-site tunnel 108 to interconnect with the private cloud gateway 110, secure access tunnels to connect public cloud VMs (cVMs) 118, and monitor and report statistics for the public cloud VMs and any component failures in the public cloud 104. In some example embodiments, the private cloud gateway 110 and the public cloud gateway 112 can be deployed as a high-availability pair to provide redundancy. In some example embodiments, the public cloud gateway 112 can include a cloud virtual switch or cloud Virtual Ethernet Module (cVEM) 116b that communicates with the VSM 114 to retrieve VM-specific network policies (e.g., port profiles), switches network traffic between public cloud VMs 118, switches network traffic between public cloud VMs and the private cloud 102, applies network policies, and monitors and reports VEM-related statistics.

In some example embodiments, each public cloud VM 118 can include an agent (not shown) that provides the network overlay for the public cloud VM. The agent can be deployed in the cVM as a secure tunnel driver. The agent can establish a secure access tunnel to connect the public cloud VM 118 to the public cloud gateway 112, and monitor and report secure overlay-related statistics. In an example embodiment, the agent can be implemented using an Intercloud Fabric™ Agent (ICA) from Cisco®.

In some example embodiments, the secure site-to-site tunnel or communication link 108 can take one of several forms, such as various types of virtual private networks (VPNs) or Layer 2 (L2) tunneling protocols. For example, some example embodiments may utilize an open VPN (e.g., OpenVPN) overlay or an IP Security (IPSec) VPN based L3 network extension to provide the communication link 108. Some example embodiments may utilize a secure transport layer (i.e., L4) tunnel as the communication link 108 between the private cloud gateway 110 and the public cloud gateway 112, where the secure transport layer tunnel 108 can be configured to provide a link layer (i.e., L2) network extension between the private cloud 102 and the public cloud 104. Some example embodiments may establish the secure transport layer (i.e., L4) tunnel 108 (e.g., Transport Layer Security (TLS), Datagram TLS (DTLS), Secure Socket Layer (SSL), etc.) over the public network 104, and can build a secure L2 switch overlay that interconnects public cloud resources with private clouds (e.g., enterprise network backbones). In other words, the secure transport layer tunnel 108 can provide a link layer network extension between the private cloud 102 and the public cloud 104.

In an example embodiment, the private cloud gateway 110 can use an L4 secure tunnel as the communication link 108 to connect to the cloud resources allocated in the public cloud 104. The L4 secure tunnel may be well-suited for use with corporate firewalls and Network Address Translation (NAT) devices due to the nature of the transport level protocols (e.g., UDP/TCP) and the transport layer ports opened for HTTP/HTTPS in the firewall. The L2 network can thus be further extended and connected to each of the cloud VMs 118 through the public cloud gateway 112. With an L2 network overlay, instances of a particular private application VM can be seamlessly migrated to the overlay network dynamically created in the public cloud 104, without any impact to existing corporate infrastructure.

Figure 2:
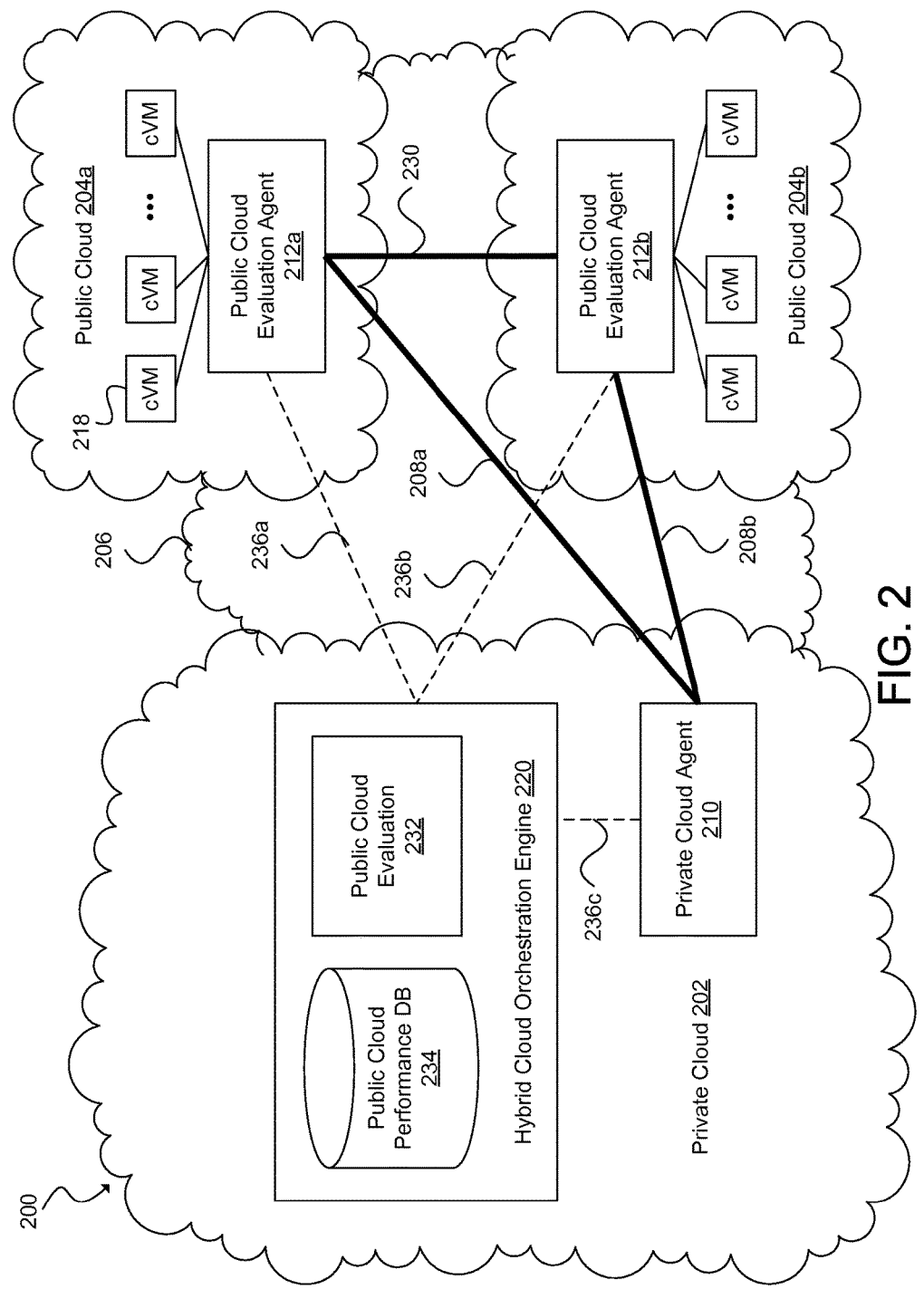
FIG. 2 illustrates a public cloud performance evaluation system for a hybrid cloud environment that can be utilized in an example embodiment.

FIG. 2 illustrates a public cloud performance evaluation system 200 that can be utilized in an example embodiment. The public cloud performance evaluation system 200 can operate within a hybrid cloud environment that includes a private cloud 202 connected to public clouds 204a and 204b through a WAN 206, such as the Internet. Public clouds 204a and 204b can represent separate third party public cloud providers, separate regions of a same public cloud provider or different public cloud providers (e.g., U.S. West and U.S. East), or separate zones of a same public cloud provider or different public cloud providers (e.g., U.S. West (San Francisco) and U.S. West (Seattle)). A secure site-to-site tunnel 208a can be used to connect the private cloud 202 to the public cloud 204a, and a secure site-to-site tunnel 208b can be used to connect the private cloud to the public cloud 204b. In the public cloud performance evaluation system 200, a secure inter-switch or inter-gateway tunnel 230 (e.g., an Inter-ICS tunnel) can be used to connect the public cloud 204a to the public cloud 204b.

The public cloud performance evaluation system 200 may include a hybrid cloud orchestration engine 220 operating in the private cloud 202. The orchestration engine 220 can be used to control a private cloud agent 210 and public cloud evaluation agents 212a and 212b. For example, the orchestration engine 220 can include a public cloud evaluation software module 232 that can be used to manage processes for evaluating the performances of infrastructure resources of one or more public clouds, such as the public clouds 204a and 204b, and/or network performance among and between the private cloud 202 and public clouds 204a and 204b. The orchestration engine 220 may also include a public cloud performance database 234 for storing the results of the performance test and network performance measurements.

The private cloud agent 210 can be configured as a VM or a network appliance that can be used to establish a tunnel endpoint for the secure tunnels 208a and 208b from the private cloud 202. The private cloud agent 210 can also be used for instantiating the public cloud evaluation agents 212a and 212b in the public clouds 204a and 204b. In the public cloud performance evaluation system 200, the private cloud agent 210 can capture network performance measurements between the private cloud 202 and the public clouds 204a and 204b using the secure tunnels 208a and 208b as data paths for the network performance measurements. The network performance measurements can correspond to private cloud-to-public cloud, public cloud-to-public cloud, region-to-region, or zone-to-zone network metrics. The private cloud agent 210 can send the collected network performance data to the hybrid cloud orchestration engine 220 via a performance data collection path 236c for processing by the public cloud evaluation module 232. In an example embodiment, the private cloud agent 210 can be implemented using an ICX from Cisco® that includes additional components for facilitating performance evaluation of a public cloud.

The public clouds 204a and 204b can include the public cloud evaluation agents 212a and 212b. The public cloud evaluation agents 212a and 212b can be implemented as cloud VMs or bare metal cloud instances, and can be used to establish tunnel endpoints for the secure tunnels 208a and 208b from the public clouds 204a and 204b to the private cloud 202. The public cloud evaluation agents 212a and 212b can also be used to establish the secure tunnel 230 to connect the public clouds 204a and 204b. The secure tunnels 208a and 208b can be used as data paths to measure network performance data between the private cloud 202 and the public clouds 204a and 204b, including cloud-to-cloud, region-to-region, and/or zone-to-zone network data. The secure tunnel 230 can be used as a data path to measure network performance data between the public clouds 204a and 204b, including inter-cloud network performance data and/or intra-cloud region-to-region and/or zone-to-zone network performance. The public cloud evaluation agents 212a and 212b can include public cloud evaluation software modules (not shown) for instantiating one or more cloud VMs 218 that execute performance benchmark suites, and for sending the performance data to the cloud orchestration engine 220 via performance data collection paths 236a and 236b. In an example embodiment, the public cloud evaluation agents 212a and 212b can be implemented as ICS's from Cisco® that include additional resources for evaluating the performance of a public cloud, and the public cloud evaluation software modules can be incorporated in ICA's from Cisco®.

Figure 3:
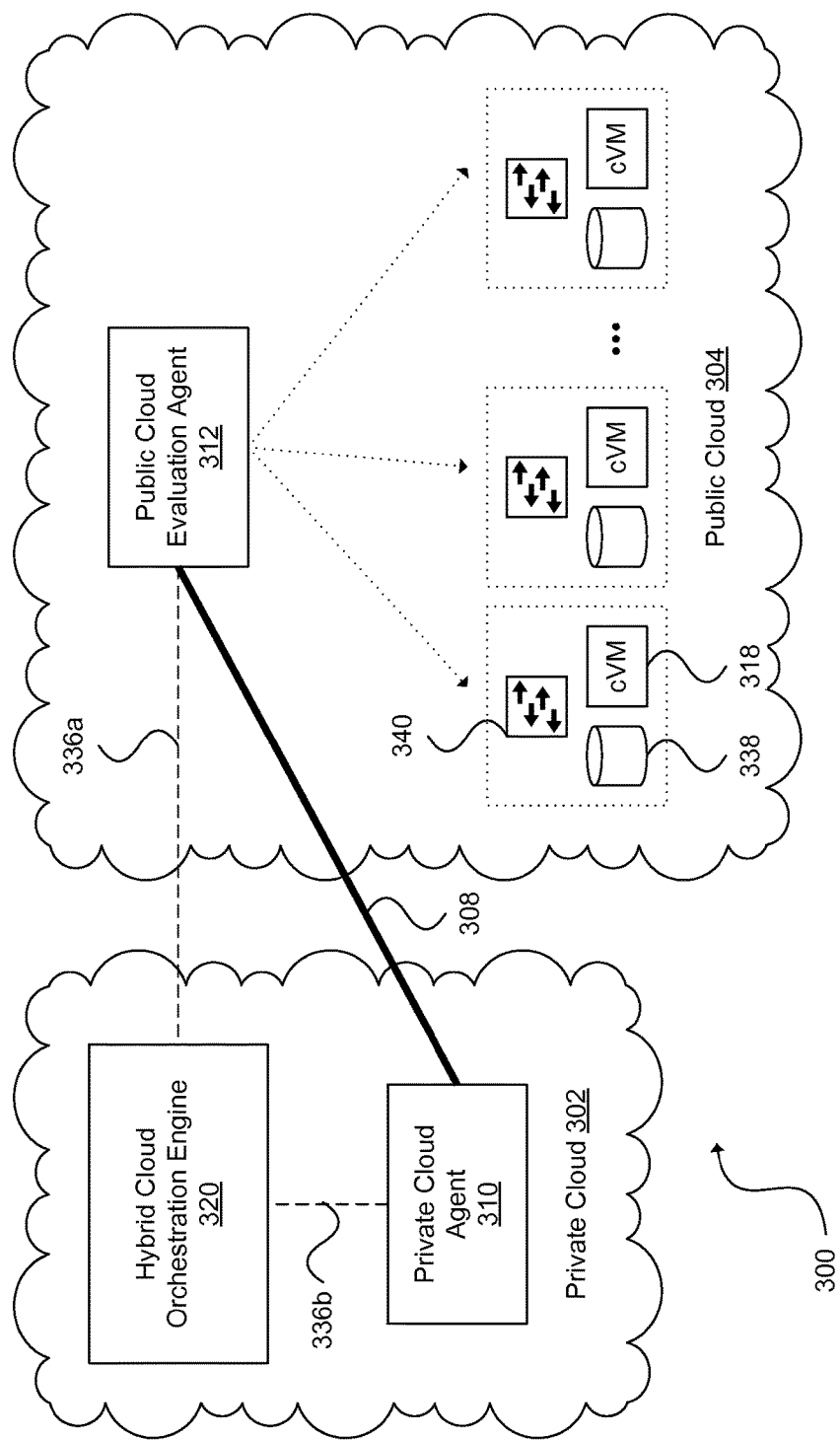
FIG. 3 illustrates an example approach for collecting performance measurements in a hybrid cloud environment that can be utilized in an example embodiment.

FIG. 3 illustrates an example approach for collecting performance measurements in a hybrid cloud environment that can be utilized in an example embodiment. It should be understood that, for any process discussed herein, there can be additional, fewer, or alternative steps performed in similar or alternative orders, or in parallel, within the scope of the various example embodiments unless otherwise stated. In this example embodiment, a public cloud performance evaluation system 300 may operate within a hybrid cloud environment that includes a private cloud 302 and a public cloud 304. The private cloud 302 and the public cloud 304 can be interconnected via a secure site-to-site tunnel 308, with a private cloud agent 310 and a public cloud evaluation agent 312 establishing respective endpoints of the tunnel. A public cloud performance evaluation process can begin after the secure tunnel 308 between the private cloud 302 and the public cloud 304 is created. For example, upon a hybrid cloud orchestration engine 320 detecting that the secure network extension 308 has been established between the private cloud 302 and the public cloud 304, the engine can direct the public cloud evaluation agent 312 to initiate the public cloud performance evaluation process. In an example embodiment, the orchestration engine 320 and the public cloud evaluation agent 312 may be directly connected via a control tunnel (not shown), and the orchestration engine can directly control the public cloud evaluation agent. In another example embodiment, the orchestration engine 320 can control the public cloud evaluation 312 via the private cloud agent 310.

After receiving a command to run the evaluation process, the public cloud evaluation agent 312 can request the public cloud 304 to provision infrastructure resources via a public cloud provider application programming interface (API). The infrastructure resources can include compute or server resources, such as provided by a cloud VM 318, a container, or other virtual partition; storage resources, such as block, file system, and/or tape storage; network resources 340, such as a digital cross-connect system, an Ethernet Metropolitan-Area Network (Ethernet MAN), or an Internet Exchange (IX); and/or some combination of infrastructure resources that may be pre-configured to provide various services such as Content Delivery Network (CDN), database, VPN, load balancing, Domain Resolution System (DNS), or image upload services, among others. The agent 312 can configure an infrastructure resource to execute a suitable benchmark for evaluating that resource with respect to comparable resources in a different zone, region, and/or cloud.

In addition to public cloud resource performance testing, the public cloud performance evaluation system 300 can also analyze network performance among and between the private cloud 302, the public cloud 304, and other private or public clouds. The network performance evaluations can include measurements for network bandwidth, throughput, latency, jitter, error rate, among other network performance metrics. For network performance measurements between the private cloud 302 and the public cloud 304, the private cloud agent 310 and the public cloud evaluation agent 312 can transmit test network data via the secure-tunnel 308. The evaluation system 300 can also be capable of measuring network performance between a specific region or zone of the private cloud 302 and a specific region or zone of the public cloud 304. In addition, the evaluation system 300 may be capable of determining network performance between different regions or zones of a same public cloud or different public clouds, and between different public clouds generally using a public cloud evaluation agent in each zone, region, and/or public cloud.

The infrastructure resource and network performance data can be sent to the orchestration engine 320 via performance data collection paths 336a and 336b to be analyzed by a public cloud evaluation module, such as public cloud evaluation module 232 of FIG. 2 (not shown), and stored by a public cloud performance database, such as database 234 of FIG. 2 (not shown). The cloud performance database can be used to generate reports for administrators to facilitate selection of a public cloud that may be most suitable for handling a particular migrated workload or use case (e.g., back-up or disaster recovery). The cloud performance database can also be used to automate public cloud selection in some example embodiments. For example, an enterprise may have a workload in a first cloud, such as private cloud or a public cloud, at a first time. Performance testing can be conducted periodically for a plurality of clouds and the cloud determined to offer the infrastructure resources that have the highest performance (e.g., shortest response time, lowest latency, highest throughput, highest bandwidth, etc.), lowest cost, lowest environmental impact, or some combination thereof, can be selected as a new cloud to execute the workload. The workload can be automatically migrated from the first cloud to the new cloud.

Figure 4:
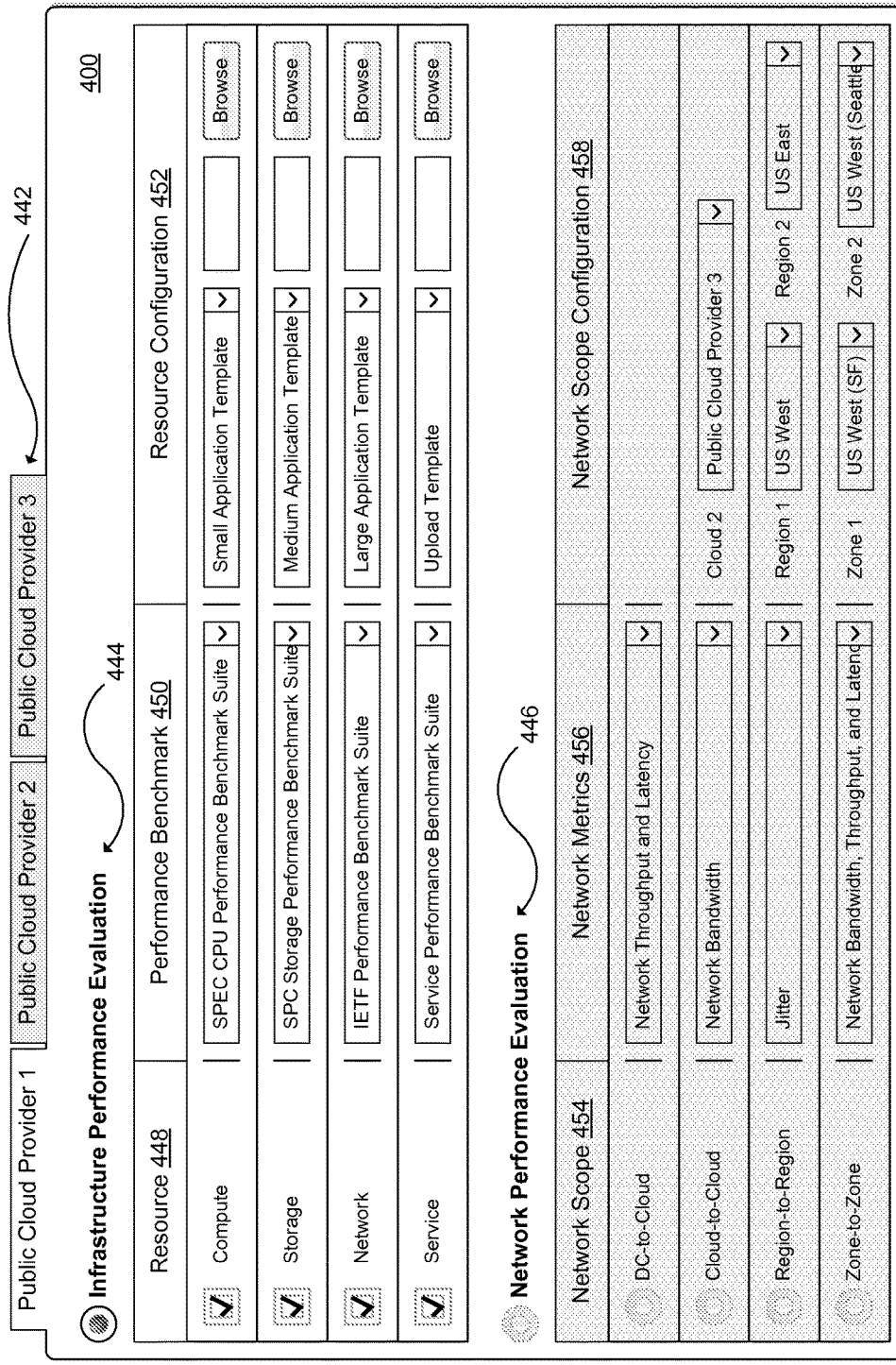
FIG. 4 illustrates an example user interface for collecting performance measurements in a hybrid cloud environment that can be utilized in an example embodiment.

FIG. 4 illustrates an example user interface 400 for collecting performance measurements in a hybrid cloud environment that can be utilized in an example embodiment. Although the user interface 400 is a graphical user interface (GUI) that can be used in a desktop application, a mobile device application or app, or a web application, it should be understood that other example embodiments may additionally or alternatively provide an API or other interface to implement aspects of the subject matter of this disclosure as should be apparent in light of the teachings and suggestions contained herein. The user interface 400 can include public cloud provider tabs 442 or other suitable user interface elements for selecting one or more public clouds that may undergo performance testing. The user interface 400 can also include user interface elements for selecting between performance evaluation of infrastructure resources 444 or performance evaluation of network performance 446 of the selected public cloud provider. In FIG. 4, selection of a radio button corresponding to the performance evaluation of infrastructure resources 444, can gray out or disable options for the evaluation of network performance 446. Similarly, selection of a radio button corresponding to the evaluation of network performance 446 may gray out or disable options for the performance evaluation of infrastructure resources 444. In another example embodiment, the options for the performance evaluation of infrastructure resources 444 can be presented on one or more separate pages from the options for the performance evaluation of network performance 446. In another example embodiment, a public cloud evaluation system can simultaneously configure the evaluations of infrastructure resources and network performance.

Resources 448 that can be evaluated by a public cloud performance evaluation system can include compute, storage, and network resources, or a combination thereof, such as in the form of services that may include CDN, database, VPN, DNS, load balancing, identification and authentication (e.g., Active Directory® from Microsoft®, key management), analytics, message queue, workflow, media, payment, email, Simple Notification Service (SNS), search, source control, or monitoring services, among others. In the user interface 400, a user may choose to performance test one or more of the resources 448 provisioned by a public cloud provider, and select a particular performance benchmark suite 450 for each selected resource to be performance tested. For example, compute performance testing benchmarks can include software provided by the Standard Performance Evaluation Corporation (SPEC) of Gainesville, Va. or the Transaction Processing Performance Council (TPC) of San Francisco, Calif.; storage performance testing benchmarks can include software provided by the Storage Performance Council (SPC) of Redwood City, Calif. or the Storage Networking Industry Association (SNIA) of Colorado Springs, Colo.; and network performance testing benchmarks can include methodologies provided by the Internet Engineering Task Force (IETF) of Fremont, Calif. or the International Telecommunication Union (ITU) of Geneva, Switzerland.

In addition to specifying the benchmark suite 450 for each selected resource to be performance tested, the user interface 400 can also enable configuration of the resources 452 used for evaluation. The resource configuration options 452 can include resource allocation parameters such as a number of Virtual CPUs (vCPUs) or Graphics Processing Units (GPUs), processing speed of the vCPU/GPUs (e.g., GHz), a size of memory or storage (e.g., GB), a type of memory or storage (e.g., hard disk drive (HDD) or solid state device (SSD)), operating system (e.g., a Windows®-based operating system from Microsoft® or a Unix-based operating system), a hypervisor, application software (e.g., database engine, developer tools, virus scanner), or a storage classification (e.g., block storage, file system storage, or tape storage); application architectures (e.g., three-tier client-server architecture or service-oriented architecture) or Application Network Profiles (ANPs) as implemented within the Application Centric Infrastructure (ACI™) provided by Cisco®; network and security policies; and other configuration options as would be known to one of ordinary skill. In an example embodiment, a public cloud performance evaluation system can support templates that can be used by a public cloud evaluation agent to automatically establish a deployment in a public cloud for performance evaluation.

The user interface 400 may also provide for customization of the performance evaluation of network performance 446. For example, the user interface 400 may include user interface elements to define the scope of the network 454 to be performance tested. The network scope 454 can be defined as between a private cloud and a public cloud, including between the private cloud and the public cloud generally, a particular region of the private cloud and a particular region of the public cloud, or a particular zone of the private cloud and a particular zone of the public cloud; between a first public cloud and a second public cloud, including between the first and second public clouds generally, a particular region of the first public cloud and a particular region of the second public cloud, or a particular zone of the first public cloud and a particular zone of the second public cloud; or between different regions or zones of a same public cloud. The user interface 400 can be used to configure these network scopes according to specific clouds, regions, and/or zones 458. The user interface 400 may also enable specification of the network measurements 456 to be determined through performance testing, such as network bandwidth, throughput, latency, jitter, error rate, and other network metrics that would be known to one of ordinary skill in the art.

Figure 5:
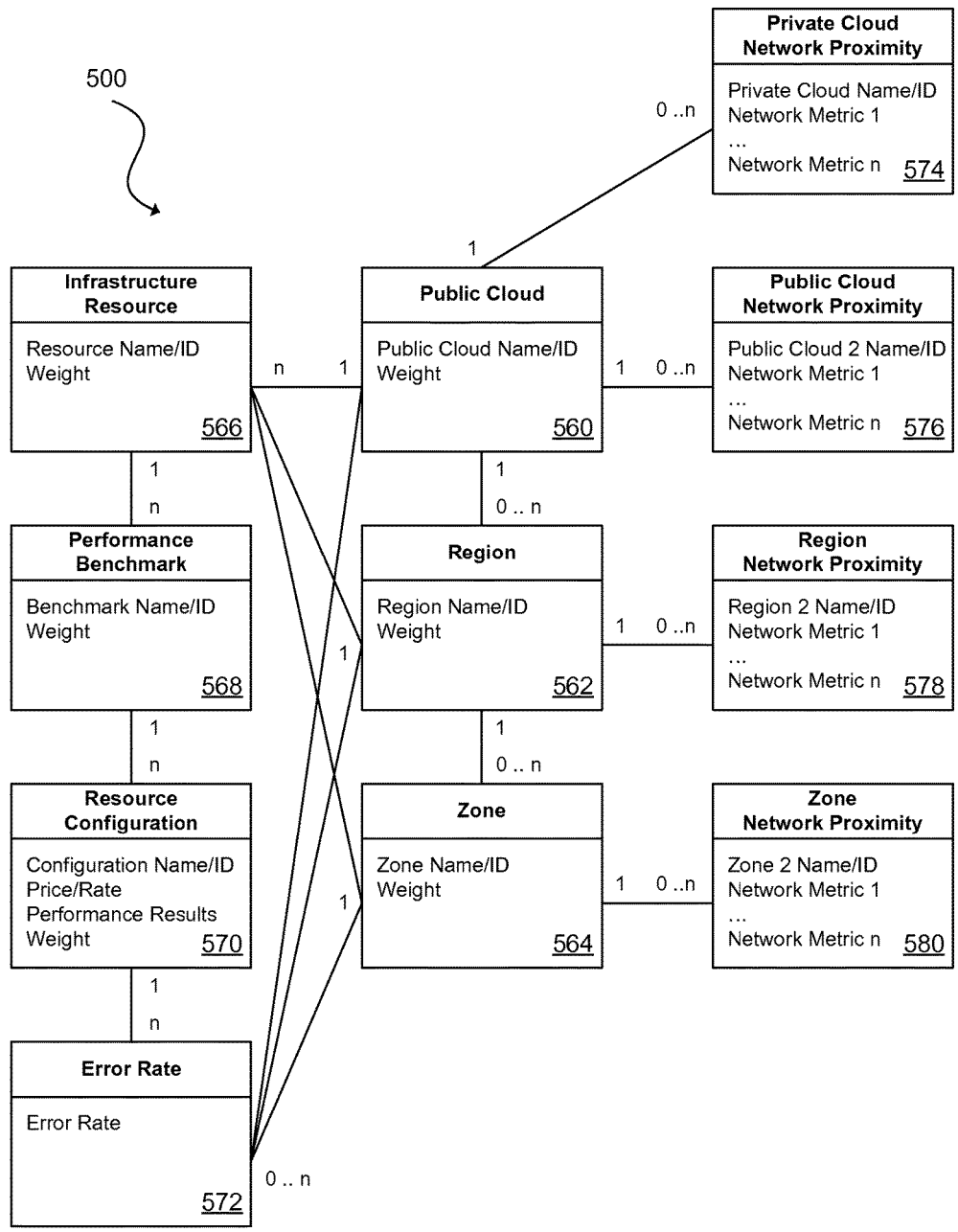
FIG. 5 illustrates an example data model for storing performance measurements in a hybrid cloud environment that can be utilized in an example embodiment.

FIG. 5 illustrates an example data model 500 for storing performance measurements in a hybrid cloud environment that can be utilized in an example embodiment. The data model 500 can include a public cloud 560 as a primary object having attributes such as a unique name and/or unique identifier and a weight for adjusting performance scores up or down. For example, a cloud weight can be adjusted upward if a cloud provider is a partner or preferred vendor, or the cloud weight can be adjusted downward if the provider is a direct competitor. Each public cloud 560 can include zero or more regions 562, and each region can have attributes such as a unique name and/or unique identifier and a weight. A region weight may be used to adjust performance scores according to preference for a particular region over another, such as favoring a region that is more geographically proximate to an enterprise's datacenter or disfavoring a region for tax reasons. Each region 562 can include zero or more zones having attributes such as a unique name and/or unique identifier and a weight. A zone weight can be customized for various reasons, such as penalizing a zone for being located in a same city as an enterprise's datacenter for disaster recovery purposes because of the greater likelihood of a natural disaster affecting the enterprise's datacenter also affecting the public cloud's datacenter in that city.

Each public cloud 560, region 562 (if applicable), and zone 564 (if applicable) can include one or more infrastructure resources 566 that have attributes such as a unique resource name and/or unique identifier and a weight. The resource weight can be used to normalize performance scores among different infrastructure resources or emphasize the importance of one particular infrastructure resource over another. For example, benchmarks for compute, storage, and network resources may have different score ranges because different attributes are being tested for each resource. To ensure that an aggregate score for a public cloud accounts for each type of resource equally, resource weights can be adjusted to normalize the score ranges for each type of resource. As another example, an enterprise may place greater weight on network performance versus compute and storage performance and the resource weight for each type of resource can be adjusted accordingly.

Each infrastructure resource 566 can be associated with one or more performance benchmarks 568 or other performance evaluation methodologies, and each performance benchmark or methodology 568 can have a unique name and/or unique identifier and a weight. The benchmark weight can be used to normalize performance results of benchmarks having different score ranges. The benchmark weight can also be used to emphasize performance results of a benchmark that may be more reliable than another benchmark or de-emphasize performance results of a benchmark that may be less reliable than another benchmark. Each performance benchmark 568 can be associated with one or more resource configurations 570 that may have attributes such as a unique name and/or unique identifier, a price/rate for deploying the resource configuration in the public cloud 560, performance evaluation results, and a weight. The resource configuration weight can be used to normalize different configurations of infrastructure resources. For example, a first resource configuration may be associated with a small application that may use fewer public cloud resources than a second resource configuration that may be associated with a large application. To make a meaningful comparison of the performances of both resource configurations, their respective weights can be adjusted to compensate for the first resource configuration using fewer infrastructure resources than the second resource configuration.

Each public cloud 560, region 562, zone 564, and resource configuration 570 may be associated with an error rate 572. The error rate 572 may indicate a number of failures occurring during operation of a particular infrastructure resource 566 executing a particular performance benchmark 568 using a particular resource configuration or deployment 570. A zone error rate may be an aggregate, mean, median, mode, or range of error rates for each infrastructure resource 566 supported by a zone 564. Likewise, a cloud error rate and region error rate may be an aggregate, mean, median, mode, or range of error rates for each region 562 of a cloud 560 or each zone of a region 562, respectively.

The data model 500 can also include an object 574 for representing network performance data between the public cloud 560 and a private cloud. The object 574 can have attributes including a name or identifier of the public cloud and network metrics captured for network performance measurements between the public cloud 560 and the private cloud. Similarly, object 576 can represent network performance data between a first public cloud 560 and a second public cloud, and the object 574 can have attributes including a name or identifier of the second public cloud and network performance data between the first and second public clouds. Each region 562 may also be associated with an object 578 that can represent network performance between a first region 562 and a second region of a private cloud, a same public cloud as the first region, or a different public cloud from the first region. The object 578 can include a region name or identifier (and cloud name or identifier if applicable) and network performance data between the first region and the second region. Likewise, each zone 564 may be associated with an object 580 that can represent network performance between a first zone 564 and a second zone of a private cloud, a same public cloud as the first zone, or a different public cloud from the first zone. It will be appreciated by those of ordinary skill in the art that a data model having fewer or a greater number of elements can operate equally well in a public cloud evaluation system, such as the public cloud evaluation systems of FIGS. 2 and 3.

Figure 6:
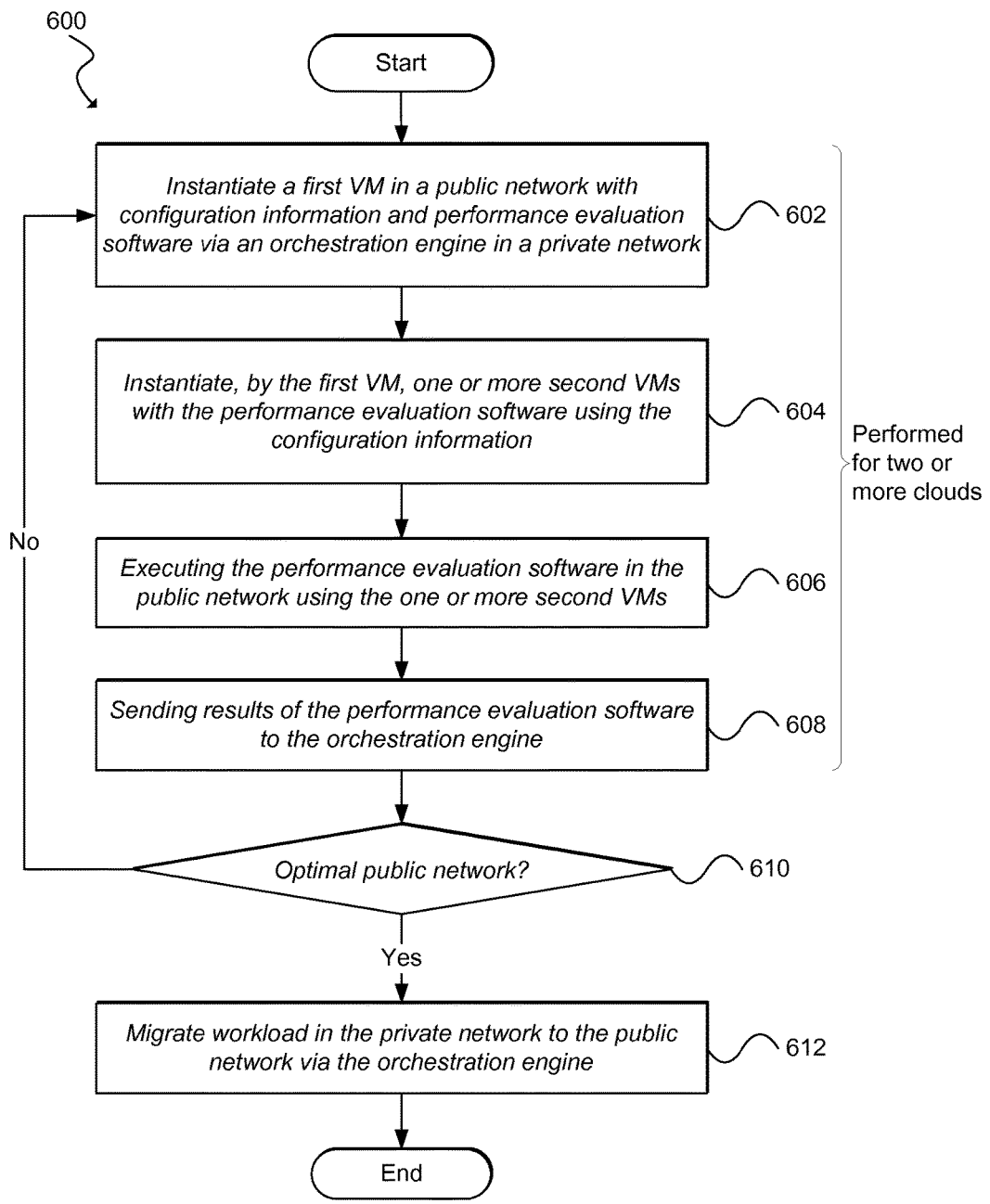
FIG. 6 illustrates an example process for collecting performance measurements in a hybrid cloud environment that can be utilized in an example embodiment.

FIG. 6 illustrates an example process 600 for utilizing a public cloud evaluation system to collect performance measurements of a public cloud in a hybrid cloud environment. Process 600 may be initiated by instantiating a first VM in the public cloud 602 that will act as a public cloud evaluation agent, such as public cloud evaluation agents 112, 212a and 212b, and 312 of FIGS. 1, 2, and 3, respectively. For example, a hybrid cloud orchestration engine located in a private enterprise network, such as orchestration engines 120, 220, and 320 of FIGS. 1, 2, and 3, respectively, or a component under its control, such as private cloud agents 110, 210, or 310 of FIGS. 1, 2, and 3, respectively, can utilize the public cloud's API to create the first VM/public cloud evaluation agent and provide the first VM/public cloud evaluation agent with configuration information for deploying a test application and performance evaluation software for the test application to execute. The configuration information and performance evaluation software can be propagated to the first VM/public cloud evaluation agent by sending the information and software over a secure tunnel (e.g., secure tunnels 108, 208a and 208b, and 308 of FIGS. 1, 2, and 3, respectively) established between the private network and the public cloud.

In an example embodiment, the first VM/public cloud evaluation agent can create a plurality of VMs in the public cloud using the configuration information, and distribute the performance evaluation software to the plurality of VMs 604. Instructions for allocating the public cloud resources for the test application can be included as part of the configuration information. As discussed, the configuration information can also include a specified number of vCPUs or GPUs, a specified processing speed of the vCPU/GPUs, a specified size of memory or storage, a specified type of memory or storage, a specified operating system, a specified hypervisor, specified application software, a specified storage classification, a specified application architecture or ANP, network and security policies, and other configuration options known to one of ordinary skill in the art. The first VM/public cloud evaluation agent may utilize the public cloud's API to instantiate the plurality of VMs and configure the plurality of VMs according to the configuration information. It should be understood that other example embodiments may instead utilize the hybrid cloud orchestration engine to allocate the public cloud resources for deploying the test application.

The plurality of VMs can execute the performance evaluation software 606, which may generate metrics relating to the performances of compute, storage, network resources and services provided by the public cloud and the error rates of the resources and services. The metrics can also include network performance measures between the private and public clouds. For example, network traffic can be exchanged between the private cloud agent and the first VM/public cloud evaluation agent to determine performance measures, such as network bandwidth, throughput, latency, jitter, and error rate. In an example embodiment, the public cloud evaluation system may be capable of calculating network performance measures between a private cloud and a public cloud generally or a specific region or zone of the private cloud and a specific region or zone of the public cloud. The public cloud evaluation system may also be capable of determining performance metrics between a pair of public networks generally, or a specific region or zone of a first public network and a specific region or zone of a second public network. It should be understood that the instructions to execute the performance evaluation software can come from the first VM/public cloud evaluation agent or via the hybrid cloud orchestration engine.

Once the performance data has been generated, it can be aggregated by the first VM/public cloud evaluation agent and sent to the private network 608 for additional processing. In an example embodiment, the performance data can be sent to the orchestration engine by the first VM/public cloud evaluation agent. The orchestration engine may process the performance data, such as by applying one or more weights to the performance data to normalize the performance data with respect to performance data collected for other public clouds or to account for preferences for a particular public cloud, region, or zone; a particular type of resource or service; a particular price/rate for the resource or service; a particular benchmark suite; a particular security design; a particular feature set (e.g., support for configuration templates, autoscaling, monitoring capabilities, etc.); among other possibilities discussed elsewhere herein and known to those of ordinary skill. The processed performance data may be stored in a public cloud performance database, such as performance database 234 of FIG. 2. Steps 602 through 608 can be repeated for other public cloud providers.

Upon the public cloud performance database being populated with the performance data of one or more public clouds, the performance data can be analyzed to determine the optimal public cloud, region, and/or zone for a particular enterprise application 610. As will be appreciated, the optimal cloud, region, and/or zone may depend on numerous factors, such as performance testing results (including network performance measures), prices/rates, error rates, security preferences, feature preferences, etc. for a public cloud's resources or services. The public cloud evaluation system disclosed herein can enable all of these various factors to be considered from a single management interface for multiple public clouds.

Process 600 can conclude with migrating an application in the private network to the public network determined to be optimal for that application 612 using the orchestration engine. In an example embodiment, process 600 can be run at certain intervals of time each day, week, or year. An application running in a first public cloud may be migrated to a second public cloud when the performance data indicates that it may be preferable to run the application in the second public cloud instead of the first public cloud. Thus, cloud selection can be based on real-time performance. In other example embodiments, performance data captured over the course of several intervals can be averaged or weight-averaged (e.g., placing greater weight on more recent performance data).

Figure 7:
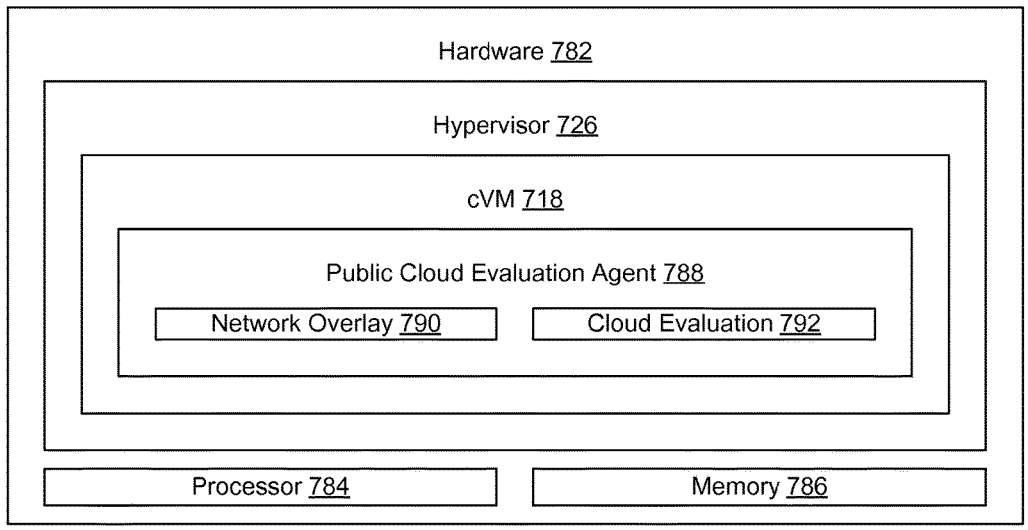
FIG. 7 illustrates an example public cloud evaluation agent that can be used in an example embodiment.

FIG. 7 illustrates an example embodiment of a physical server 724, such as the physical server 124 of FIG. 1. The physical server 724 can include hardware 782, a hypervisor 726 (e.g., hypervisor 126 of FIG. 1), and a public cloud virtual machine 718 (e.g., cVM 118 of FIG. 1). Hardware 782 can represent any machine or apparatus capable of accepting, performing logic operations on, storing, or displaying data, and may include a processor 784 and memory 786. In this example embodiment, a public cloud evaluation agent 788 can be installed on the cVM 718 when the cVM is deployed on the physical server 724. The public cloud evaluation agent 788 can include software, such as a network overlay module 790 and a cloud evaluation module 792. The network overlay module 790 can be used to provide a compute environment and network overlay for the cVM 718, and can include logic for establishing a secure tunnel (e.g., secure tunnels 108, 208a and 208b, and 308 of FIGS. 1, 2, and 3, respectively) to connect the cVM 718 to a private network via the secure tunnel. The cloud evaluation module 792 can include logic for performing the processes discussed in this disclosure, including the processes discussed with respect to FIGS. 2-5.

Figure 8:
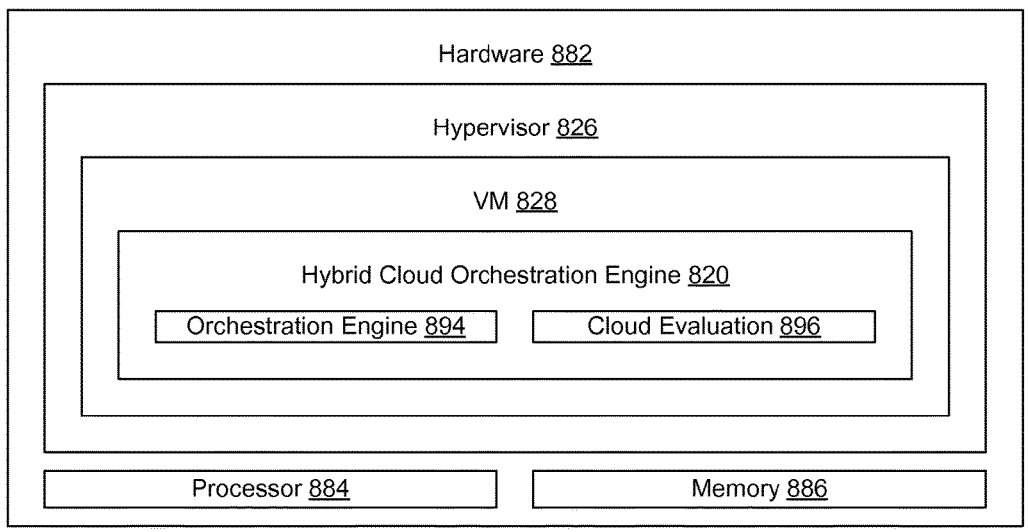
FIG. 8 illustrates an example hybrid cloud orchestration engine that can be used in an example embodiment.

FIG. 8 illustrates an example embodiment of a physical server 824, such as the physical server 124 of FIG. 1. The physical server 824 can include hardware 882 and software, such as hybrid cloud orchestration software 820. The hybrid cloud orchestration software 820 can include an orchestration module 894 for managing hybrid cloud operations, translating between private cloud and public cloud interfaces, managing cloud resources, instantiating cloud gateways and cloud VMs, monitor the health of all components of the network, and ensure high availability of network components, such as cloud gateways, VMs, and tunnels. The hybrid cloud orchestration software 820 can also include a cloud evaluation module 896 for performing the processes discussed in this disclosure, including the processes discussed with respect to FIGS. 2-5.

Hardware 882 can represent any machine or apparatus that is capable of accepting, performing logic operations on, storing, or displaying data, and may include a processor 884 and memory 886. Memory 886 can include, for example, a public cloud performance database, such as the performance database 234 of FIG. 2. Memory 886 can further include one or more tables, lists, or other data structures for storing data associated with certain operations described herein.

In an example embodiment, physical servers 724 and 824 can be network elements, which can encompass network appliances, servers, routers, switches, firewalls gateways, bridges, load balancers, modules, or any other suitable device, proprietary component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with the above network elements, each of the physical servers 724 and 824 can include memory elements for storing information to be used in the operations disclosed herein. Additionally, physical servers 724 and 824 may also include virtual memory elements for storing information associated with virtual partitions. The physical servers 724 and 824 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory elements discussed herein (e.g., memory 786 and 886) should be construed as being encompassed within the broad term memory element or memory. Information being used, tracked, sent, or received by the physical servers 724 and 824 can be provided in any database, register, queue, table, cache, control list, or other storage structure, all of which can be referenced at any suitable timeframe. Any such storage options may be included within the broad term memory element or memory as used herein.

In an example embodiment, the physical servers 724 and 824 may include software modules (e.g., cloud evaluation modules) to achieve, or to foster operations as outlined herein. In other example embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

For clarity of explanation, in some instances the subject matter of this disclosure may be presented as including individual functional blocks including functional blocks comprising devices, device components, steps or routines in a method embodied in software, or combinations of hardware and software.

Note that in certain example embodiments, the public cloud performance evaluation functions outlined herein may be implemented by logic encoded in one or more tangible, non-transitory media (e.g., embedded logic provided in an application specific integrated circuit (ASIC), digital signal processor (DSP) instructions, software (potentially inclusive of object code and source code) to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described example embodiments can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to the subject matter of this disclosure can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   creating a first virtual machine in a first public cloud and one or more second virtual machines in a second public cloud;
   causing the first virtual machine to create a first plurality of virtual machines in the first public cloud and one or more second virtual machines to create a second plurality of virtual machines in the second public cloud;
   causing the first plurality of virtual machines to execute first performance evaluation software and the second plurality of virtual machines to execute second performance evaluation software;

receiving first performance data generated from execution of the first performance evaluation software and second performance data generated from execution of the second performance evaluation software; and selecting the first public cloud to host an application based at least in part on a comparison between the first performance data and the second performance data, wherein,
the first performance data relates to at least one of a compute resource, a storage resource, a network resource, or a service of the first public cloud.

2. The method of claim 1, further comprising:

establishing a first secure tunnel between the first public cloud and a private cloud and a second secure tunnel between the second cloud and the private cloud, the first public cloud using an endpoint in the private cloud and the first virtual machine;

causing the first virtual machine to send first network traffic to the private cloud and the second virtual machine to send second network traffic to the private cloud;

receiving third network traffic from the first virtual machine and fourth network traffic from the second virtual machine; and determining a first measure of network performance between the first public cloud and the private cloud based at least in part on the first network traffic and the third network traffic, and a second measure of network performance between the second public cloud and the private cloud based at least in part on the second network traffic and the fourth network traffic, wherein the first public cloud is selected to host the application further based at least in part on a second comparison between the first measure of network performance and the second measure of network performance.

3. The method of claim 2, wherein the first virtual machine is created in one of a first specified region or a first specified zone of the first public cloud and the endpoint is located in a second specified region or a second specified zone of the private cloud.

4. The method of claim 2, wherein at least one of the first measure of network performance or the second measure of network performance includes at least one of bandwidth, throughput, latency, jitter, or error rate.

5. The method of claim 1, further comprising:

creating a third virtual machine in a third public cloud;

causing the third virtual machine to create one or more third virtual machines in the second public cloud that each includes third performance evaluation software;

causing the one or more fourth virtual machines to execute the third performance evaluation software to generate third performance data; and receiving the third performance data, wherein selecting the first public cloud to host the application is further based at least in part on comparing the first performance data and the third performance data.

6. The method of claim 5, further comprising:

establishing a secure tunnel between the first public cloud and the second public cloud using the first virtual machine and the third virtual machine;

causing the first virtual machine to send first network traffic to the third virtual machine via the secure tunnel;

causing the first virtual machine to receive second network traffic from the third virtual machine via the secure tunnel; and determining a measure of network performance between the first public cloud and the second public cloud based at least in part on the first network traffic and the second network traffic, wherein selecting the first public cloud to host the application is further based at least in part on the measure of network performance.

7. The method of claim 5, wherein the first virtual machine is created in one of a first specified region or a first specified zone of the first public cloud, and the third virtual machine is created in one of a second specified region or a second specified zone of the second public cloud.

8. The method of claim 5, further comprising:

applying one or more weights to normalize the first performance data relative to the second performance data.

9. The method of claim 1, wherein creating the first virtual machine includes:

requesting for the first virtual machine from a provider of the first public cloud via a public cloud provider application programming interface (API); and installing a cloud evaluation agent on the first virtual machine that includes configuration information for creating the one or more second virtual machines and the second performance evaluation software to be executed by the one or more second virtual machines.

10. The method of claim 9, wherein the configuration information includes at least one of a number of virtual Central Processing Units (vCPUs) or Graphics Processing Units (GPUs), a processing speed of the vCPUs or GPUs, a size of a memory resource or a storage resource, a type of the memory resource or the storage resource, an operating system, a hypervisor, application software, a storage classification, an application architecture, a network policy, or a security policy.

11. The method of claim 1, further comprising:

establishing a control tunnel between an orchestration engine in a private cloud and the first virtual machine to enable the orchestration engine to directly control the first virtual machine.

12. A non-transitory computer-readable storage medium having stored therein instructions that, upon being executed by one or more processors cause the one or more processors to:

create a first virtual machine in a first public cloud and a second virtual machine in a second public cloud;

cause the first virtual machine to create a first plurality of virtual machines in the first public cloud and the second virtual machine to create a second plurality of virtual machines in the second public cloud;

cause the first plurality of virtual machines to execute first performance evaluation software and the second plurality of virtual machines to execute second performance evaluation software;

receive first performance data generated from execution of the first performance evaluation software and second performance data generated from execution of the second performance evaluation software; and select the first public cloud to host an application based at least in part on a comparison between the first performance data and the second performance data.

13. The non-transitory computer-readable storage medium of claim 12, wherein the instructions upon being executed further cause the one or more processors to:

establish a first secure tunnel between the first public cloud and a private cloud and a second secure tunnel between the second public cloud and the private cloud;

cause the first virtual machine to send first network traffic to the private cloud and the second virtual machine to send second network traffic to the private cloud;

receive third network traffic from the first virtual machine and fourth network traffic from the second virtual machine; and determine a first measure of network performance between the first public cloud and the private cloud based at least in part on the first network traffic and the third network traffic and a second measure of network performance between the second public cloud and the private cloud based at least in part on the second network traffic and the fourth network traffic, wherein the first public cloud is selected to host the application further based at least in part on a second comparison between the first measure of network performance and the second measure of network performance.

14. The non-transitory computer-readable storage medium of claim 12, wherein the instructions upon being executed further cause the one or more processors to:

establish a secure tunnel between the first public cloud and the second public cloud;

send first network traffic from the first virtual machine to the second virtual machine via the secure tunnel;

receive second network traffic by the first virtual machine from the second virtual machine via the secure tunnel; and determine a measure of network performance between the first public cloud and the second public cloud based at least in part on the first network traffic and the second network traffic, wherein the first public cloud is selected to host the application further based at least in part on the measure of network performance.

15. The non-transitory computer-readable storage medium of claim 12, wherein the instructions upon being executed further cause the one or more processors to:

apply one or more weights to normalize the first performance data relative to the second performance data.

16. A system comprising:

one or more processors; and memory including instructions that, upon being executed by the one or more processors, cause the system to:

create, from a private cloud, a first virtual machine in a public cloud;

create, by the first virtual machine, a plurality of virtual machines in the public cloud that each includes performance evaluation software;

execute, by the plurality of virtual machines, the performance evaluation software to generate performance data;

send the performance data from the first virtual machine to the private cloud; and select, from the private cloud, the public cloud to host an application based at least in part on the performance data.

17. The system of claim 16, wherein the instructions upon being executed further cause the system to:

establish, from the private cloud, a secure tunnel between the private cloud and the public cloud using an endpoint in the private cloud and the first virtual machine;

send first network traffic from the first virtual machine to the endpoint via the secure tunnel;

receive the first network traffic by the endpoint;

send second network traffic from the endpoint to the first virtual machine;

receive the second network traffic by the first virtual machine; and determine a measure of network performance between the private cloud and the public cloud based at least in part on the first network traffic and the second network traffic, wherein the public cloud is selected to host the application further based at least in part on the measure of network performance.

18. The system of claim 16, wherein the instructions upon being executed further cause the system to:

create, from the private cloud, a second virtual machine in a second public cloud;

create, by the second virtual machine, a second plurality of virtual machines in the second public cloud that each includes second performance evaluation software;

execute, by the second plurality of virtual machines, the second performance evaluation software to generate second performance data; and receive the second performance data by the private cloud, wherein the public cloud is selected to host the application further based at least in part on the second performance data.

19. The system of claim 18, wherein the instructions upon being executed further cause the system to:

establish, from the private cloud, a secure tunnel between the public cloud and the second public cloud using the first virtual machine and the second virtual machine;

send first network traffic from the first virtual machine to the second virtual machine via the secure tunnel;

receive the first network traffic by the second virtual machine;

send second network traffic from the second virtual machine to the first virtual machine;

receive the second network traffic by the first virtual machine; and determine a measure of network performance between the public cloud and the second public cloud based at least in part on the first network traffic and the second network traffic, wherein the public cloud is selected to host the application further based at least in part on the measure of network performance.

20. The system of claim 16, further comprising:

a public cloud performance database.

* * * * *